United States Patent [19]

Véré et al.

[11] Patent Number: 4,633,569
[45] Date of Patent: Jan. 6, 1987

[54] PROCESS AND DEVICE FOR POSITIONING HAIR-PIN SPRINGS ON PLATE, PARTICULARLY FOR FUEL ASSEMBLY GRIDS

[75] Inventors: Bernard Véré, Eybens; Paul Mathevon, Bollene; Michel Decarsin, Villeurbanne, all of France

[73] Assignee: Cogema et Framatome, Velizy Villacoublay, France

[21] Appl. No.: 545,012

[22] Filed: Oct. 24, 1983

[30] Foreign Application Priority Data

Oct. 22, 1982 [FR] France .................................. 82 17717

[51] Int. Cl.⁴ .............................................. B23Q 7/10
[52] U.S. Cl. ........................................ 29/514; 29/521; 29/809
[58] Field of Search ................. 29/513, 514, 521, 809, 29/810, 814, 818, 811; 376/414, 429, 438, 448, 449

[56] References Cited

U.S. PATENT DOCUMENTS 4,261,098 4/1981 Lincoln .......................... 29/814 X

FOREIGN PATENT DOCUMENTS 1514110 9/1969 Fed. Rep. of Germany ...... 376/438

Primary Examiner—Howard N. Goldberg
Assistant Examiner—Timothy V. Eley
Attorney, Agent, or Firm—Pollock, Vande Sande & Priddy

[57] ABSTRACT

The device of the invention allows a hair-pin spring with two legs to be inserted astride a plate having windows for locally welding the legs together. This device receives one plate at a time and moves it lengthwise, and a corridor guides each spring in turn, the spring being moved along the corridor towards its insertion position. A mask movable parallel to the plane of the plate from the edge furthest from the zone through which the introduction takes place allows the window to be covered furthest from the zone through which the introduction takes place so as to avoid jamming.

9 Claims, 9 Drawing Figures

PROCESS AND DEVICE FOR POSITIONING HAIR-PIN SPRINGS ON PLATE, PARTICULARLY FOR FUEL ASSEMBLY GRIDS

FIELD OF THE INVENTION

The invention relates to the positioning of hair-pin springs for supporting the fuel rods in fuel assembly spacer grids, before they are secured to the grids.

BACKGROUND OF THE INVENTION

Fuel assemblies used inter alia in PWRs comprise a bundle of fuel elements (each formed by a stack of pellets in a fluid tight sheath) held in place in a structure. This latter comprises grids spaced apart along the assembly, each formed by plates disposed along two orthogonal directions, to define cells. Most cells accomodate fuel elements. Each of such cells is provided with means engaging the fuel element which passes through the cell for supporting it.

The supporting means may be formed by cut-out parts of the plates, forming lugs bearing against the rods. But it is of advantage to use springs fastened to the plates and made of a material different from the plates. A grid of the latter type is described, for example, in French Pat. No. 2,474,229 to which reference may be made.

The springs have in general a hair-pin shape with two legs. There is frequently a need for several types of spring in the same grid since the grid has lateral walls and some cells accomodate elements other than fuel elements, e.g., by guide tubes. One of the types will frequently comprise two identical legs whereas another type will have legs of different shapes. The springs are first inserted, then secured to the plates by welding the two legs together at predetermined points, between which are located windows formed in the grid plates. The positioning of each spring is tricky: it is necessary to locate each spring accurately so as not to weld it on the plate and to avoid contamination. Up to now, the springs have been located and welded manually, which is time consuming and tedious, and further likely to give rise to errors when springs of different types must be placed at well-defined locations on the plate. It may be thought that one of the reasons why this procedure has not been automated resides in the risks of catching the legs of the springs on the numerous unevenesses of the plate during insertion of a spring whose legs are spaced apart by a distance which may not be exactly defined because of their resilience.

OBJECT OF THE INVENTION

It is an object of the invention to provide an improved process and device for spring positioning. It is a more specific object to provide for more rapid and reliable positioning.

SUMMARY OF THE INVENTION

To this end, there is provided a process for inserting hair-pin springs with two legs astride a plate provided with windows allowing the legs to be welded locally to each other; the plate is held in a predetermined position; each spring is moved while maintained in an orientation close to the plane of the plate into its insertion position, perpendicular to the length of the plate; before the spring is inserted, that window of the plate which is further away from the zone through which the introduction of the spring takes place is covered with masks movable parallel to the plane of the plate so as to avoid undesirable engagement of one end of a leg of the spring in the window; and the sequence of operations is repeated after moving the plate lengthwise by one or more predetermined steps.

In a particular embodiment of the invention, the sequence of positioning the springs incorporates the electric welding of the two legs of a spring to each other immediately after the spring has been positioned and before the plate is moved for positioning the next spring. Thus, it is certain that no untimely movement of the spring has occurred between the insertion operation and the welding operation.

A device according to the invention for inserting hair-pin springs with two legs astride a plate provided with windows allowing the legs to be welded locally to each other comprises means for receiving one plate at a time and moving it in the direction of its length; a corridor for guiding each spring in turn, associated with means for moving the spring along the corridor towards its insertion position, cooperating so as to maintain the spring in an orientation close to the plane of the plate during movement thereof, and masks movable parallel to the plane of the plate from the edge thereof furthest from the zone through which the introduction takes place for covering, on both sides of the plate, window the furthest from the zone through which the introduction takes place so as to avoid untimely engagement of one end of a leg of the spring in this window.

BRIEF DESCRIPTION OF THE DRAWINGS

The invention will be more clearly understood from the following description of devices which form particular embodiments thereof, given by way of example and illustrated by the accompanying drawings, in which.

DETAILED DESCRIPTION OF PREFERRED EMBODIMENTS

Figure 1:
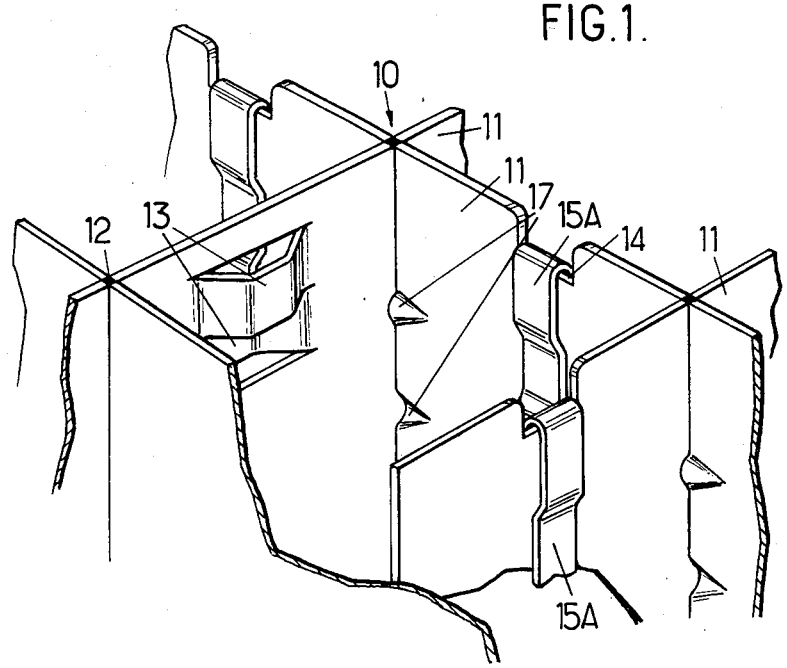
FIG. 1 is a perspective view of a fragment of a fuel assembly grid whose springs may be inserted by means of a device in accordance with the invention.

The embodiments of the invention which will now be described may be used more especially for fitting the springs shown in FIGS. 3A and 3B to the plates of a grid of the kind shown in FIG. 1. This grid 10 is formed by plates 11, generally made from a zirconium based alloy called "Zircaloy", lap-jointed together and welded at their connection points 12.

Each of plates 11 comprises bosses 13 against which fuel rods (not shown) come to bear and different apertures cooperating with the springs for applying the rods to the bosses. FIG. 1 shows only double springs 15A which are inserted into indentations 14 in the plates formed in one of the edges.

Figure 2:
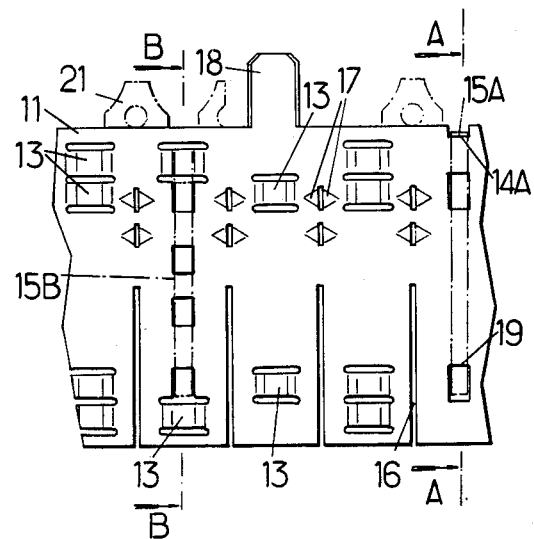
FIG. 2 is a detail elevation view showing a fragment of a plate of the grid of FIG. 1, provided with apertures and the necessary deformations for receiving the springs.

In plate 11 shown schematically in FIG. 2, there have been shown in an artifical way different types of apertures and deformations which are met with in a grid 10. In this figure can be seen the slits 16 for the lap-joint assembly, placed opposite guide intervals defined by studs 17. A vertical median strip of plate 11 which carries two bosses 13 directed on the same side is equipped with a tongue 18 for fixing the grid to a guide tube (not shown) belonging to the framework of the assembly. On the left of this strip provided with bosses 13 directed towards a single side of the plate is shown a strip having openings for receiving a single spring 15B whose outline is shown with a broken line. On the left of this strip is shown another having bosses 13 projecting on both sides of the plate, as shown on one of the sides of the complete cell visible in FIG. 1. An identical strip has been shown immediately on the right of the one which carries a fixing tongue 18. Finally, the last strip on the right has an indentation 14 for receiving a double spring 18A. The fins 21 shown in dash-dot lines and appearing on one of the edges of the plate are provided solely on some of the plates.

Figure 3A:
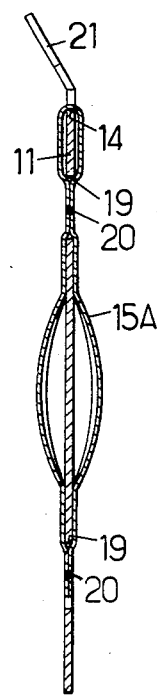
FIGS. 3A and 3B are views, respectively in section along lines A—A and B—B of FIG. 2, showing respectively a double spring (with two active legs) and a single spring (one leg of which forms the spring and the other a stop)

As shown in FIG. 3A, each of springs 15A may be positioned by sliding its legs on each side of the plate 11 until the upper loop of the spring comes into contact with the plate, at the bottom of indentation 14. Windows 19 provided in the plate (FIGS. 2 and 3A) allow the two legs of the spring to be fixed directly to each other by a spot weld 20.

Figure 3B:
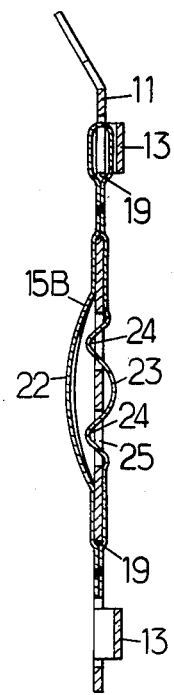

The single spring 15B shown in FIG. 3B is of assymetrical construction. Its leg 22 is similar to the legs of spring 15A. The other leg 23 is designed so as to form a swivel joint defined by two bends 24 able to contact with leg 22 through openings 25 in the plate, so as to avoid transmitting the compression stresses to this latter. As in the preceding case, the two legs of spring 15B are welded to each other through windows 19 on the terminated grid. However, the loop is not positioned at the bottom of an indentation, but in an extension of the upper opening 19, provided by one of the bosses 13. It is therefore not possible to pass the legs 22 and 23 directly on each side of the plate.

This suppression of the indentation, which is troublesome in so far as insertion of the spring is concerned, is frequently indispensable, for the indentation would excessively weaken the plate at a position where it already has bosses 13 formed by stampings which have an important supporting role but an unfavorable effect on the strength of the plate.

There will now be described successively two devices adapted for positioning springs 15A and 15B, respectively. Naturally one of these devices would be sufficient in the case where the insertion mode is the same for all springs. And, for other forms of springs or plates, it might be necessary to modify these devices.

Figure 4:
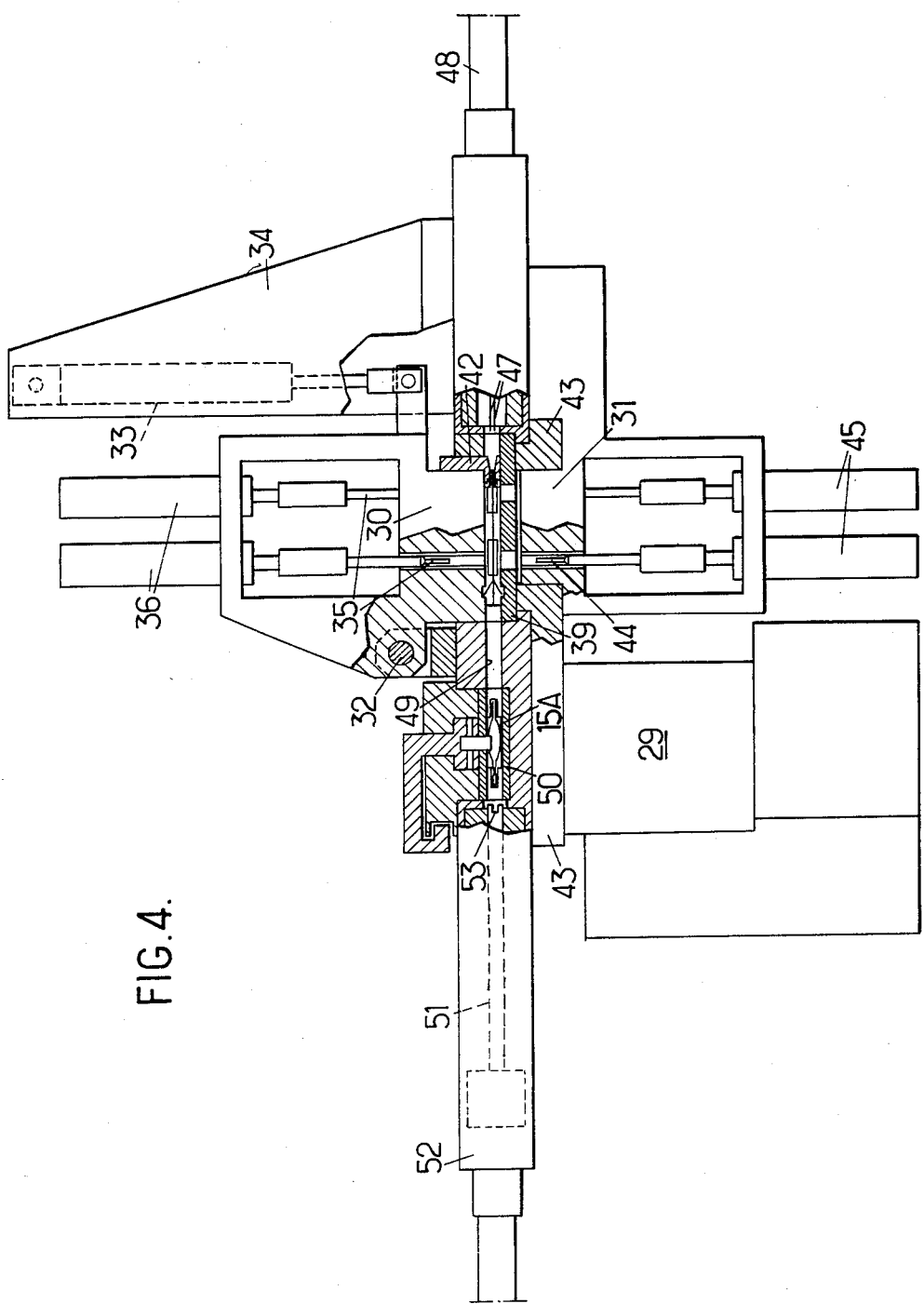
FIG. 4 is a simplified diagram, in elevation and in partial section through a vertical plane, showing a device for fitting the double spring.
Figure 5:
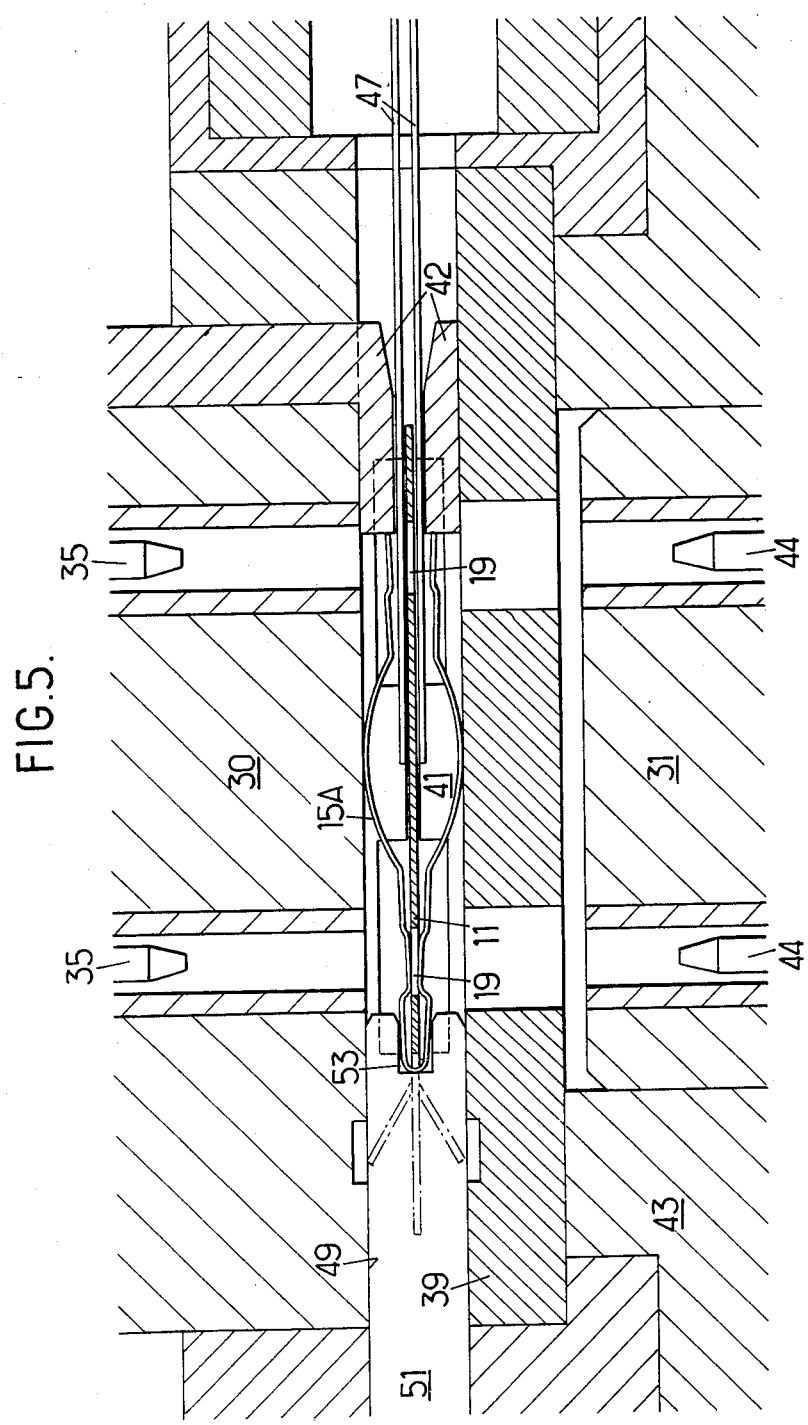
FIG. 5 is an enlarged view of a portion of FIG. 4.

The device shown in FIG. 4, the portion of which providing for accurate positioning and welding of the spring is shown in FIG. 5, is intended for fitting springs 15A. This device comprises a frame 29 integral with a fixed lower jaw 31. An upper mobile jaw 30 is mounted for rotation about a shaft 32 integral with jaws 30 and 31. An operating cylinder 33, for example a pneumatic cylinder, is mounted between a bracket 34 integral with the fixed lower jaw 31 and the mobile upper jaw 30. This cylinder swings jaw 30 between the work position in which it is shown in FIGS. 4 and 5 and a position in which it frees the station for positioning and welding the spring, thus allowing a plate 11 to be positioned or removed.

The lower jaw 31 comprises means for receiving one plate at a time and moving it lengthwise, i.e., transversely to the plane of FIGS. 4 and 5. In the illustrated embodiment, these means comprise a slider 39 having profiled grippers 41. The plate is fixed by means (not shown) situated at the ends of the lower gripper. The grippers further comprise a spring stop 42, whose role will be explained further on. The slider is supported by a slide 43 secured to the frame at both its ends by means not shown. The frame further supports means for advancing the slider by steps equal to the interval which separates two successive strips of plate 11.

In the fixed part of the device is provided a corridor 49 for guiding each spring in turn, associated with means for moving the spring along the corridor towards the plate. In the embodiment illustrated in FIG. 4, this corridor is formed in a piece integral with the frame and extends between the positioning and welding post and a chamber for receiving a loader 50 into which the springs 15A are stacked, transversely to the plane of the figure. Loader 50 has an internal profile which matches the shape of the springs and it contains a compression spring (not shown) which pushes the spring stack after each extraction of a spring so as to bring another one opposite the guide corridor 49. In a variant, the spring supply is provided by a strip arrangement of the springs, connected together by tenons which are severed when they are introduced into the guide corridor 49. The means for moving the spring comprises a double acting cylinder 52, for example a pneumatic cylinder, whose piston is extended by a rod 51 terminating in an indentation 53 intended to be applied against the upper loop of the spring 15A to be inserted. During use of the cylinder 52 from the rest position shown in FIG. 4, rod 51 pushes the spring until its legs bear against the stop 42.

The device shown in FIG. 4 is intended not only for positioning the springs but also for welding them in position. To this end, the jaws 30 and 31 each comprise a set of electrodes. The upper jaw 30 comprises two electrodes 35 each of which may be actuated by a cylinder, for example a pneumatic cylinder 36, for moving them between the rest position in which they are illustrated in FIG. 4 and a work position in which the electrodes rest on the spring, opposite the windows 19 of the plate. Similarly, the lower jaw 31 is provided with two electrodes 44 which may be actuated by cylinders 45. When the two sets of cylinders are actuated, the two opposite legs of the facing spring 15A are applied one against the other through the windows 19.

Although the means for moving the spring guide this latter while holding it in an orientation parallel to the plane of the plate towards its insertion position, from one of the edges of the plate, there is a risk of the end of a leg of the spring catching on the window 19 furthest from the introduction edge. To overcome this risk, the device shown in FIG. 4 comprises mobile masks 17 for covering the window 19 during introduction of spring 15A. These masks 47 are formed by two thin metal sheets movable by means of a cylinder 48, for example a pneumatic cylinder, between the retracted position in which they are shown in FIG. 4 and the extended position in which they are shown in FIG. 5 and in which they cover the window 19 are terminate at mid-length of the plate. The spacing between these metal sheets is set by a wedge (not shown) to a value slightly greater than the thickness of the plate.

The device is completed by means for supplying the welding electrodes with power and by a mechanism for sequentially controlling the different elements, which will in general be formed by a programmable robot, although manual control by an operator is obviously possible. A device may be provided for vibrating the slider 39 so as to facilitate positioning of the spring. In all cases, the operation will be as follows during the fitting up of the plate.

With the upper jaw 30 raised, a bare plate 11 is positioned while the slider occupies the positon in which the first strip of plate 11 is facing corridor 49. The upper jaw is closed, with the electrodes of the two jaws in the position shown in FIGS. 4 and 5. The grippers carrying the plate are then captured and can only move transversely to the plane of the figure. If the first strip is to receive a spring 15A, cylinder 48 is first of all actuated to bring the masks 47 into the position shown in FIG. 5, then cylinder 52 is actuated to bring rod 41 from the position shown in FIG. 4 to the position shown in FIG. 5 and to insert spring 15A. The cylinders 36 and 45 are actuated to apply the electrodes 35 and 44 against the legs of the spring and to hold them in position on the plate. Rod 51 and masks 47 are retracted by actuating cylinders 52 and 48, withdrawal of the masks being accompanied by the two legs of spring 15A coming into contact through the windows 19, under the action of the electrodes. Welding is then carried out, then electrodes 35 and 44 are retracted. The means for transversely moving slider 39 are actuated so as to move the plate either by one step or by several steps, depending on whether or not the next position of the plate is equipped with a double spring whereupon the sequence is repeated. Once the plate has been completely equipped, the upper jaw 30 is opened so as to allow the plate to be removed and to be replaced by a bare plate.

There will now be described, with reference to FIGS. 6 to 8, a device for positioning springs by introducing them not by an endmost edge of the plate but through an opening therein. Such a device is therefore more especially suitable for positioning single springs 15B on plates 11.

For that purpose, it is necessary to introduce the spring through a corridor which holds the spring in an orientation which is not that of the plane of the plate, but is close to it. Moreover, the device is advantageously placed so that the force of gravity acting on the spring to be inserted promotes insertion thereof.

The device of FIGS. 6 to 8 has a general construction similar to the one already described with reference to FIGS. 4 and 5, and the corresponding parts will be designated by the same number, but with the addition of a subscript 1. It again comprises a frame $29_1$ on which is fixed a lower jaw $31_1$, carrying a shaft $32_1$ about which a cylinder $33_1$ causes an upper jaw $30_1$ to swing. However, the frame is so placed that the plate 11 to be equipped is held not horizontally but at an angle $\alpha$ which will generally be of the order of 30°. Furthermore, corridor $49_1$ is sloped with respect to the plane of the plate, generally a slope of the order of 20°, and it is placed so as to guide the non-active leg of spring 15B towards the introduction window 19. It can be seen that the corridor has a total slope with respect to the horizontal of the order of about 50°, which allows the spring to slide by gravity along plate 11 after the action of the introduction rod $51_1$ (FIG. 7) has stopped. We find again, in the device of FIGS. 6 to 8, masks $47_1$ and the role of the upper mask is here particularly important because of the increased risk of the upper leg of spring 15B catching in the window or the windows furthest from the introduction zone.

Figure 6:
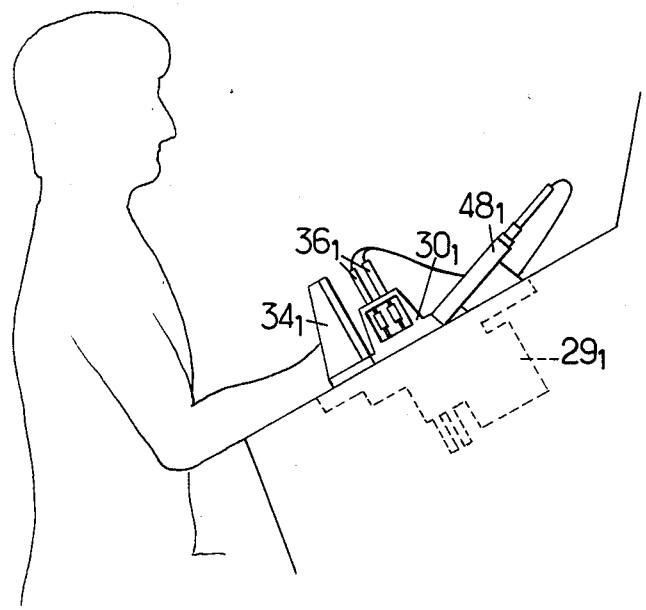
FIG. 6 is a schematic view in elevation of a work second comprising a device for fitting a single spring.
Figure 7:
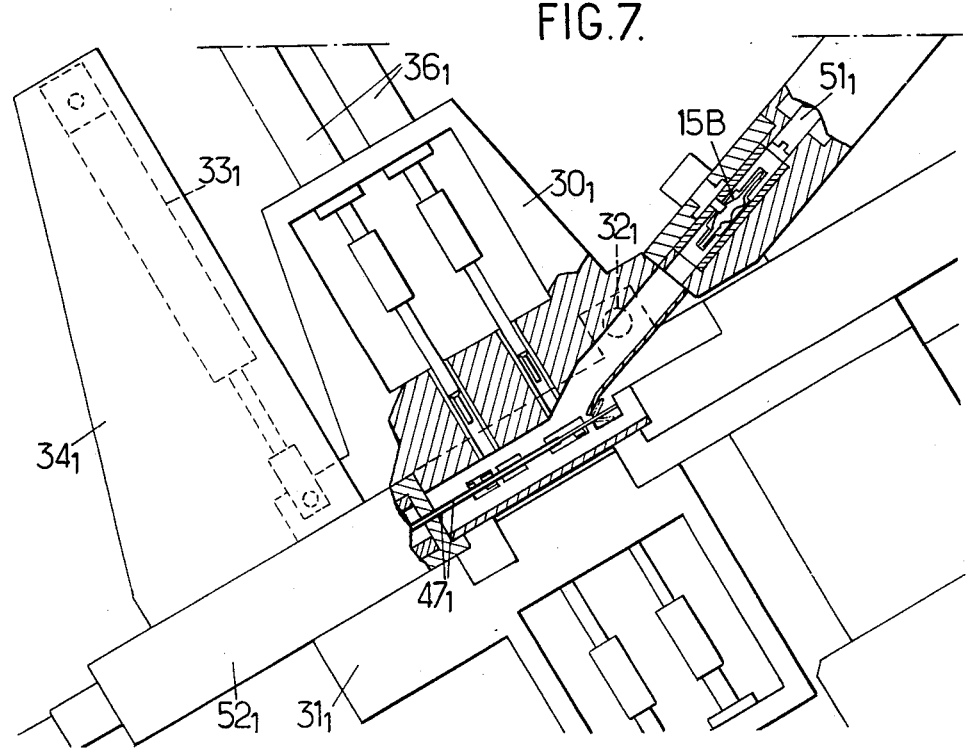
FIG. 7 is an elevational view in partial section showing the fitting device of FIG. 6.
Figure 8:
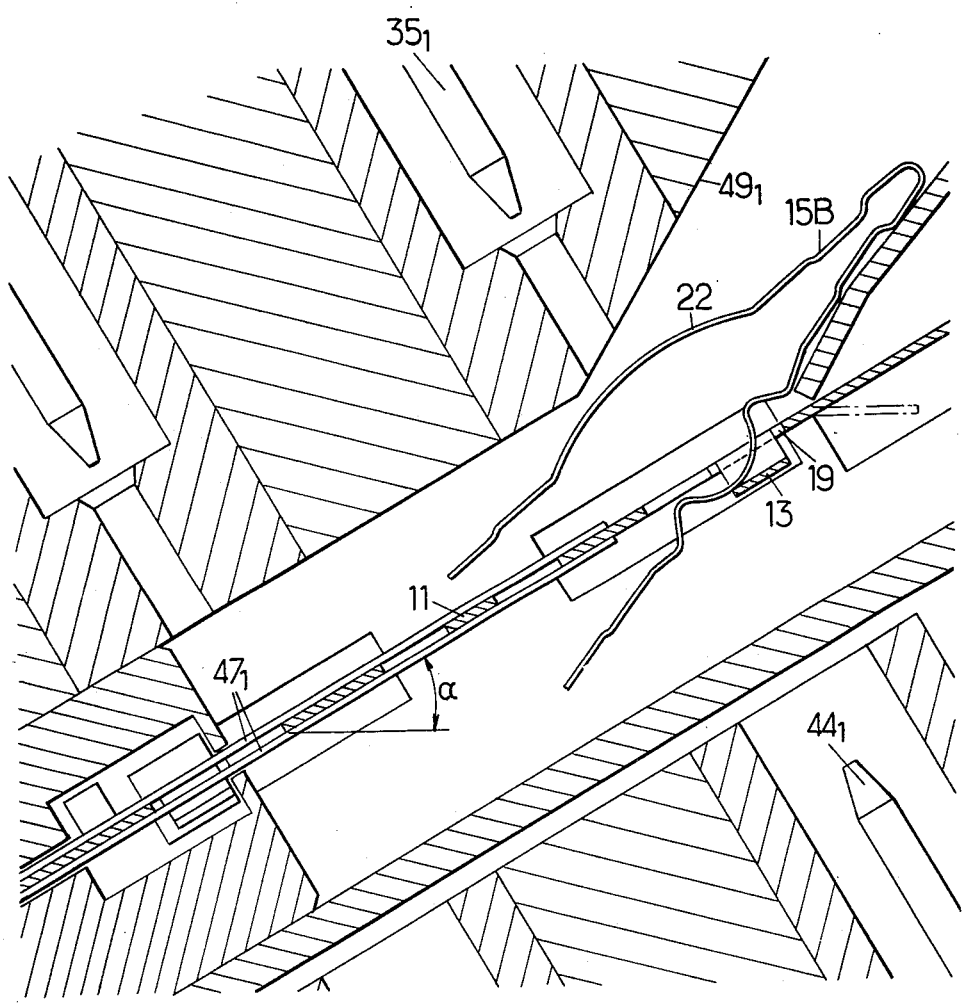
FIG. 8 is an enlarged detail view of a fragment of FIG. 7, a spring being shown in the process of being inserted.

The operation of the device of FIGS. 6 to 8 is very similar to that of the device of FIGS. 4 and 5: the plates to be equipped, already possibly provided with their double spring, are again placed in a slider movable by means not shown.

The devices which have just been described may be integrated into a working whole also comprising a supply device formed by an assembly of storage drawers placed at the side of the frame of each device and having drawers receiving on one side the bare plates (or already equipped with a type of spring) and the full spring loaders, and on the other, drawers for storing the plates equipped before discharge thereof. The sequential programmable control robot may be of an entirely conventional kind. It will be generally provided so as to carry out all the required control operations, possibly by completing the device with feelers (not shown).

We claim:

1. A device for inserting hair-pin springs each having two legs over the edge of a plate positioned in a plane and formed with windows distributed along a direction parallel to said edge, each into the position where said legs straddle said plate and confront each other through a respective one of said windows, said device comprising (a) transport means for receiving one plate at a time and moving it step by step along said direction parallel to said edge thereof;

(b) corridor means for guiding each of said springs in turn toward an insertion position of said spring into said plate, directed substantially perpendicularly to said edge;

(c) means for moving one spring at a time along said corridor means towards said insertion position, cooperating with said corridor means for holding said spring in an angular position close to said plane of said plate during movement thereof transversely to said edge;

(d) masking means movable parallel to the location of said plate in said transport means from the edge thereof opposite to the edge over which insertion takes place between a position where said masking means covers on at least one side of said plate, at least one of said windows, in order to avoid accidental engagement of one leg of said spring in that window.

2. A device according to claim 1, further comprising two sets of welding electrodes for moving said electrodes between a retracted position in which they are clear of said transport means and an advanced position in which they bear against said legs of spring and press them against each other through at least one of said windows.

3. A device for inserting hair-pin springs each having two legs over the edge of a plate positioned in a plane and formed with windows distributed along a direction parallel to said edge, each into a position where said legs straddle said plate and confront each other through a respective one of said windows, said device comprising (a) transport means for receiving one plate at a time and moving it step by step along said direction parallel to said edge thereof;

(b) corridor means for guiding each of said springs in turn toward an insertion position of said spring into said plate, directed substantially perpendicularly to said edge; '(c) means for moving one spring at a time along said the corridor means towards said insertion position, cooperating with said corridor means for holding said spring in an angular position close to said plane of said plate during movement thereof transversely to said edge for preventing an end of a leg of said spring catching in said window; and (d) electrode means movable transversely to the plane of said plate between a retracted position and an advanced position in which they press the legs of said spring against each other through said window for welding.

4. A device according to claim 3, further comprising a frame, a jaw fixed to said frame, and a jaw movable with respect to said fixed jaw between a closed position in which said jaws retain said transport means against movement and a spaced apart position in which said jaws release said transport means and allow one of said plates to be positioned or removed.

5. A device according to claim 4, wherein said transport means comprise slider means supported by a slide carried by said fixed jaw and having step by step advancing means.

6. A device according to claim 3, further comprising a loader for containing a stack of said springs and presenting said springs in succession at an entrance of said corridor means.

7. A device according to claim 3, wherein said corridor means is placed so as to guide each said spring symmetrically with respect to the plane of plane and to insert it across the edge of said plate opposite that from which movement of said mask takes place.

8. A device according to claim 3, wherein said corridor means is at an angle to the horizontal and placed so as to guide said spring at a slight obliquity with respect to the plane of said plate towards a position causing the introduction of a leg of said spring in an opening formed in said plate.

9. A device according to claim 8, wherein said means for receiving said plate are formed to give said plate a slope facilitating introduction of said spring.

* * * * *